May 8, 1951 A. J. PAIK 2,552,057
MIXING APPARATUS
Filed Dec. 11, 1948 2 Sheets-Sheet 1
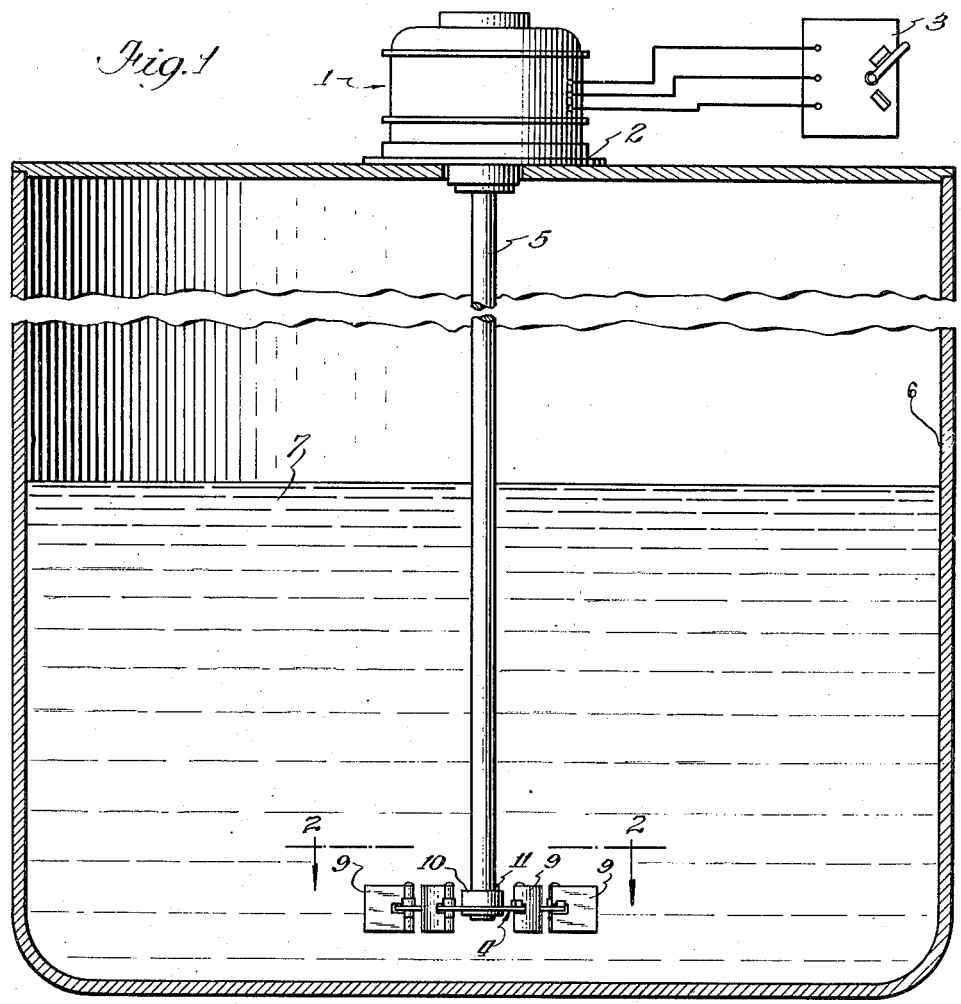
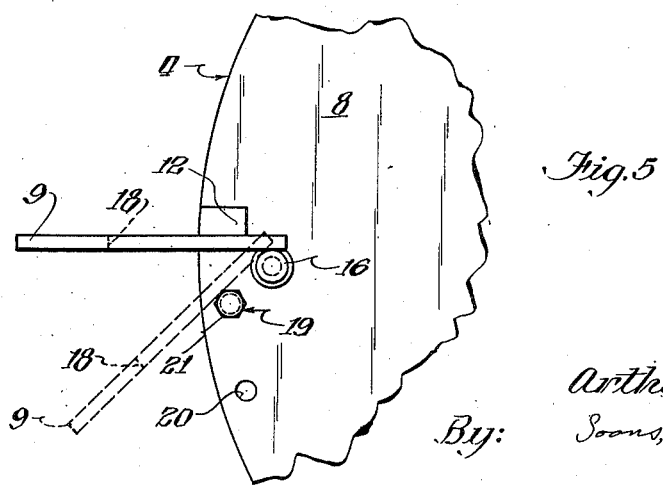
Inventor:
Arthur J. Paik
By: Soans, Pond, & Anderson
Atty's.

May 8, 1951          A. J. PAIK          2,552,057
MIXING APPARATUS
Filed Dec. 11, 1948          2 Sheets-Sheet 2
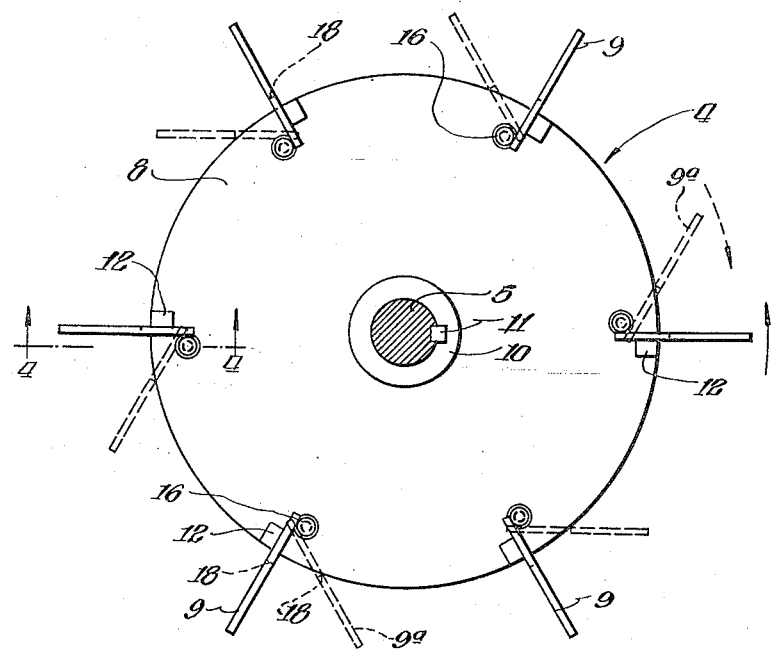
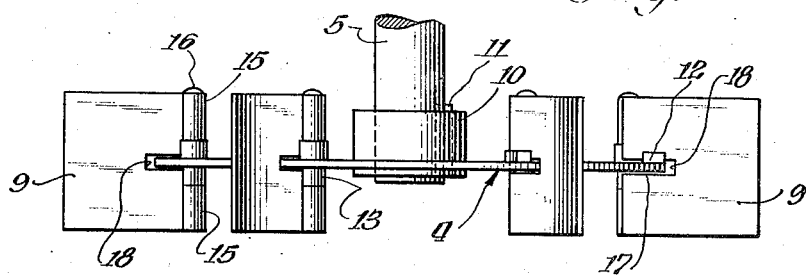
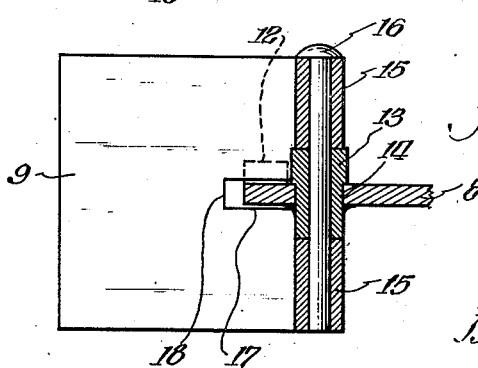

Patented May 8, 1951

2,552,057

UNITED STATES PATENT OFFICE 2,552,057

MIXING APPARATUS

Arthur J. Paik, Berwyn, Ill., assignor to Abbott Laboratories, North Chicago, Ill., a corporation of Illinois Application December 11, 1948, Serial No. 64,765

6 Claims. (Cl. 259—133)

The present invention relates generally to a mixing device and has particular relation to a device which will efficiently stir a liquid varying in density and/or viscosity, while being processed.

As is well known, when various liquids are stirred or mixed under certain conditions, their density and/or viscosity undergoes a rather rapid change. Such a change occurs when certain antibiotics are produced, for example, streptomycin and penicillin. These antibiotics result from an aerobic fermentation process. In order to prepare for the process, the apparatus and liquid materials must be sterilized. This is accomplished by the heating of the surrounding apparatus and the liquid, and, at the same time stirring the liquid.

The aerobic fermentation process involves the aeration of the sterilized liquid material and this is accomplished by the bubbling of air therethrough. One of the results of this aeration is the substantial reduction in density of the liquid. Thus, a substantial change in density occurs between the two steps causing a proportionate change in the torque exerted on the stirring means and the motor or drive therefor. If a constant speed motor and a given impeller are used for both steps in the production of these antibiotics, the power input to the liquid material greatly decreases during the aeration step from that required during the sterilization step due to the change in load condition. This results in inefficient operation of the mixing apparatus. This same effect could result in a system involving a change in viscosity of a liquid.

While the aerobic fermentation process has been particularly described above, it should be noted that there are many other processes during which the density or viscosity of a liquid being stirred or mixed undergoes a rather rapid change. In such situations, it would be highly desirable to have a mixing device which would provide approximately the same power input to a liquid even though it varies in density and viscosity.

Various methods for accomplishing efficient mixing or stirring under different physical conditions of liquid have been suggested. For example, a variable speed motor has been mentioned, but while this may be a good theoretical answer to the difficulty, it does not offer a practical solution. In particular, a variable speed motor with a substantial power rating is much more expensive than a similarly rated, constant speed motor, and further, variable speed motors are not readily available at the higher power ratings. Another suggestion for surmounting the above mentioned difficulty requires the changing of impellers in the mixer as the viscosity or density changes. This suggestion is also objectionable because of the required interruption of the process and the expense involved. In the case of aerobic fermentation, the suggestion is impossible because the liquid is under pressure, and, in order to insure sterility of the liquid, the tank containing the liquid cannot be opened. Other suggestions for the efficient stirring of liquids which vary in their physical properties while being processed have been expensive and not generally practicable.

Therefore, the principal object of this invention is to provide an improved mixing device for the stirring of liquid which changes in physical characteristics while being processed. Further objects include the provision of a mixing device capable of efficient stirring under varying physical conditions of the liquid, and the provision of a device that is easy and inexpensive to manufacture, simple in operation, and adjustable under prescribed conditions. A more specific object of the invention is to provide an impeller mechanism for mixing devices which is automatically adjustable under different operating conditions.

Still further objects and advantages of the present invention will become apparent by referring to the accompanying drawings and following description of a preferred embodiment of the invention.

In the drawings:

Fig. 1 is a vertical section view through a mixing device including an impeller mechanism according to the present invention;

Fig. 2 is a view taken along line 2—2 in Fig. 1;

Fig. 3 is a side elevational view on an enlarged scale of the impeller mechanism shown in Figs. 1 and 2;

Fig. 4 is a view, partly in section taken along line 4—4 in Fig. 2; and

Fig. 5 is an enlarged plan view of a portion of the periphery of a modified impeller construction.

The mixing device shown in the drawings is capable of mixing or stirring with equal facility and efficiency liquids varying in density or viscosity. This desirable result is accomplished through the use of a constant speed, reversible electric motor in conjunction with an impeller mechanism fabricated in accordance with the invention.

Insofar as concerns the present invention, it will make no difference whether the viscosity, density, or both are varied in a particular process.

The improved mixing device illustrated in the drawings, includes a constant speed, reversible electric motor 1, means 2 for supporting the motor, switching means 3 interconnected with the reversible motor for reversing the direction of rotation thereof. An impeller mechanism 4 is disposed on the lower end of a shaft 5, the other end of which is connected to the motor being driven thereby. A vat or tank 6 supports the motor and is adapted to contain liquid 7 and the impeller mechanism 4 during operation.

The motor 1, switching means 3 and shaft 5 may be of any well known type and the shaft 5 is connected at its upper end to the motor in a conventional manner.

The impeller mechanism 4 can be fabricated from any suitable material and includes a generally flat disc member 8 and a plurality of impellers 9 pivotally attached to said disc member in a balanced relation or arrangement about the axis of rotation of said disc member. A cylindrical hub 10 is attached approximately in the center of the disc 8 and is fitted on and keyed to the shaft 5, as indicated at 11. Stops 12 are provided on the disc to limit the swing of the impellers 9.

The impeller mechanism 4 has six equally spaced, generally flat, rectangular impellers 9 disposed about the outer periphery of the disc portion 8 which are pivotally attached and generally normal thereto. It should be understood however, that the number and shape of the impellers is not important to the present invention. For example, impellers having curved backs or holes drilled in their faces may be used.

The impellers 9 may be supported on the disc portion 8 in any well known manner. For example, a sleeve 13 is fitted into a hole 14 provided in the disc portion 8 and it is preferably welded thereto. Two sleeves 15 are attached to each impeller adjacent the inward edge thereof in such vertically spaced relation that they may be fitted over the disc supported sleeve 13. A bolt or pivot pin 16 is inserted through the sleeves 13 and 15 and serves as an axis for pivotal movement of the impeller 9. A horizontal slot 17 is cut approximately in the center of the face of the impeller 9 and is dimensioned so as to allow the impeller to partially straddle the disc portion 8 and to allow swinging movement of the impeller about its pivot mounting. The base or bottom 18 of the slot 17 is engageable with the periphery of the disc 8 to limit pivoting movement of the impeller in one direction.

The pivoting of the impellers 9 in the other direction is restricted by stops 12 which are attached to the disc portion 8. These stops 12 which are preferably welded to the disc, are so placed as to cause the impellers 9 to extend radially out from the disc portion 8 when they are forced against the stops 12. This, of course, will be the position when the impeller mechanism is rotated in one direction and the position wherein the impellers will encounter maximum resistance from the tank contained liquid. It should be noted from the foregoing discussion that the pivoting of each impeller 9 is subjected to two limitations, namely, the stop 12 and the bottom 18 of the slot 17. Since the impellers 9 are all similarly connected to the disc 8, they will be pressed against the stops 12 when the disc is rotated in one direction, and will be automatically pivoted to place the bottoms 18 of the slots 17 against the periphery of the disc portion 8 when it is rotated in the opposite direction. These two alternative positions of the impellers are shown in Fig. 2 wherein the impellers 9, represented by the solid lines, are shown pressed against the stops 12 and occurs when the impeller mechanism 4 rotates counterclockwise. The impellers 9a represented by the dotted lines, are shown restricted by the bottoms 18 of the slots 17 which occurs when the impeller mechanism 4 is rotated in a clockwise direction.

In the modification shown in Fig. 5, the pivotal movement of the impeller 9 is limited in one direction by means of a detachable stop 19 which is seated on the disc so as to be adjustable to selected positions for supporting the impeller 9 in various resistance positions.

The detachable stops 19 comprise a plurality of holes 20 which are formed in the disc 8 adjacent the outer periphery thereof, and a plurality of bolts 21 or the like proportioned to fit said holes 20. The heads of the bolts or stops 21 provide the stopping action and are so disposed adjacent the periphery of the disc portion 8 as to prevent the impellers 9 from swinging back to the bottoms 18 of the slots 17, when the impeller mechanism 4 is rotated in a clockwise direction. The impeller 9, in Fig. 5 is shown in one position by broken lines in which position the impeller will encounter less than maximum resistance when the impeller mechanism 4 is rotated clockwise in a liquid. Thus, through this modification of the impeller mechanism 4 the mixing device may be adapted to liquids which change in density or viscosity between various limits during processing.

During operation of the improved mixing device in the aerobic fermentation process wherein the liquid changes from a greater to a lesser density in the process the motor 1 and impeller mechanism 4 are supported on the tank 6 and the fermentation solution is made up in the tank 6 so as to partially or wholly immerse the impeller mechanism 4. The motor 1 is then started by the switching device 3 so as to turn the impeller mechanism 4 in a clockwise direction as viewed in Fig. 2. The impellers 9 automatically shift to their position of least resistance, as shown at 9a in Fig. 2 allowing the rather dense liquid to be adequately mixed without overloading the motor. When the required stirring is completed, the motor 1 is stopped, air is bubbled through the liquid 7 and the motor 1 is actuated in the opposite direction whereon the impellers 9 automatically pivot to their position of maximum resistance by engaging the stops 12. Thus, through the automatic adjustment of the impeller mechanism 4 an approximately equal load is translated to the motor 1, allowing the efficient use of a comparatively inexpensive constant speed motor. The motor speed may be the same in both directions or it may be higher in one direction than in the other. Such reversible constant speed motors having the same or different speeds of rotation in their opposite directions, are readily available on the market and at much less cost than variable speed motors in high horsepower ratings such as required in large capacity mixers.

While the operation of the mixing device has been described with reference to a particular process it should be understood that the improved mixing device may be used for mixing or stirring in other processes wherein the density or viscosity of the liquid changes substantially while being stirred and it is intended that the present invention be in no way limited to the above described process.

In the foregoing, a device capable of simple and relatively economical manufacture has been devised for the mixing or stirring of a liquid which varies in density and/or viscosity while being processed. This marks an important advancement in the mixing art, and the various features of this important and highly desirable device are set forth in the appended claims.

I claim:

1. A mixing device comprising a reversible rotatable member, two or more impellers mounted on said member in balanced relation about the axis of rotation of said member, said impellers being also so mounted that, as an incident to changes in the direction of rotation of said member, said impellers are movable relative to said member through a predetermined range of movement from each to the other of a pair of terminal positions, one of said terminal positions being nearer than the other to a plane which extends radially of said member, whereby said impellers are operative to present larger effective impelling areas in one of said terminal positions in one direction of rotation than in their other terminal positions and the opposite direction of rotation.

2. A mixing device comprising a reversible rotatable member, two or more impellers mounted on said member in balanced relation about the axis of rotation of said member, said impellers being pivoted on said member so that, as an incident to changes in the direction of rotation of said member, said impellers are swingable relative to said member through predetermined arcs of movement from each to the other of a pair of terminal positions, one of said terminal positions being nearer than the other to a plane which extends radially of said member, whereby said impellers are operative to present larger effective impelling areas in one of said terminal positions in one direction of rotation than in their other terminal positions and the opposite direction of rotation.

3. A mixing device comprising a reversible rotatable member, two or more impellers pivotally mounted on said member in balanced relation about the axis of rotation of said member, the axis of said pivot mountings being substantially parallel to and spaced from said axis of rotation, means for limiting the pivotal movability of said impellers to a predetermined range of movement wherein the terminal positions of said impellers are at different angles to a plane which extends radially of said member and in the direction of the axis thereof, said impellers being automatically shiftable from one terminal position to the other as an incident to changes in the direction of rotation of said member, whereby said impellers are operative to present larger effective impelling areas in one of said terminal positions and one direction of rotation than in the other terminal position and the opposite direction of rotation.

4. A mixing device comprising a reversible rotatable member, two or more impellers mounted on said member in balanced relation about the axis of rotation of said member, said impellers being also so mounted that, as an incident to changes in the direction of rotation of said member, said impellers are movable relative to said member through a predetermined range of movement from each to the other of a pair of terminal positions, one of said terminal positions being nearer than the other to a plane which extends radially of said member, whereby said impellers are operative to present larger effective impelling areas in one of said terminal positions in one direction of rotation than in their other terminal positions and the opposite direction of rotation, and a reversible, constant speed electric motor connected to said rotatable member for selectively rotating said member and the impellers mounted thereon in either direction of rotation.

5. A mixing device comprising a reversible rotatable member, two or more impellers mounted on said member in balanced relation about the axis of rotation of said member, said impellers being pivoted on said member so that, as an incident to changes in the direction of rotation of said member, said impellers are swingable relative to said member through predetermined arcs of movement from each to the other of a pair of terminal positions, one of said terminal positions being nearer than the other to a plane which extends radially of said member, whereby said impellers are operative to present larger effective impelling areas in one of said terminal positions in one direction of rotation than in their other terminal positions and the opposite direction of rotation, and a reversible, constant speed electric motor connected to said rotatable member for selectively rotating said member and the impellers mounted thereon in either direction of rotation.

6. A mixing device comprising a reversible rotatable member, two or more impellers pivotally mounted on said member in balanced relation about the axis of rotation of said member, the axis of said pivot mountings being substantially parallel to and spaced from said axis of rotation, means for limiting the pivotal movability of said impellers to a predetermined range of movement wherein the terminal positions of said impellers are at different angles to a plane which extends radially of said member and in the direction of the axis thereof, said impellers being automatically shiftable from one terminal position to the other as an incident to changes in the direction of rotation of said member, whereby said impellers are operative to present larger effective impelling areas in one of said terminal positions and one direction of rotation than in the other terminal position and the opposite direction of rotation, and a reversible, constant speed electric motor connected to said rotatable member for selectively rotating said member and the impellers mounted thereon in either direction of rotation.

ARTHUR J. PAIK.

REFERENCES CITED

The following references are of record in the file of this patent:

UNITED STATES PATENTS

| Number | Name | Date |
| --- | --- | --- |
| 16,210 | Lightfoot | Dec. 9, 1856 |
| 291,766 | Petersen | Jan. 8, 1884 |
| 507,059 | Beatty | Oct. 17, 1893 |
| 1,520,746 | Boyce et al. | Dec. 30, 1924 |
| 1,576,641 | Beekley | Mar. 16, 1926 |